United States Patent Office 3,179,297
Patented Apr. 20, 1965

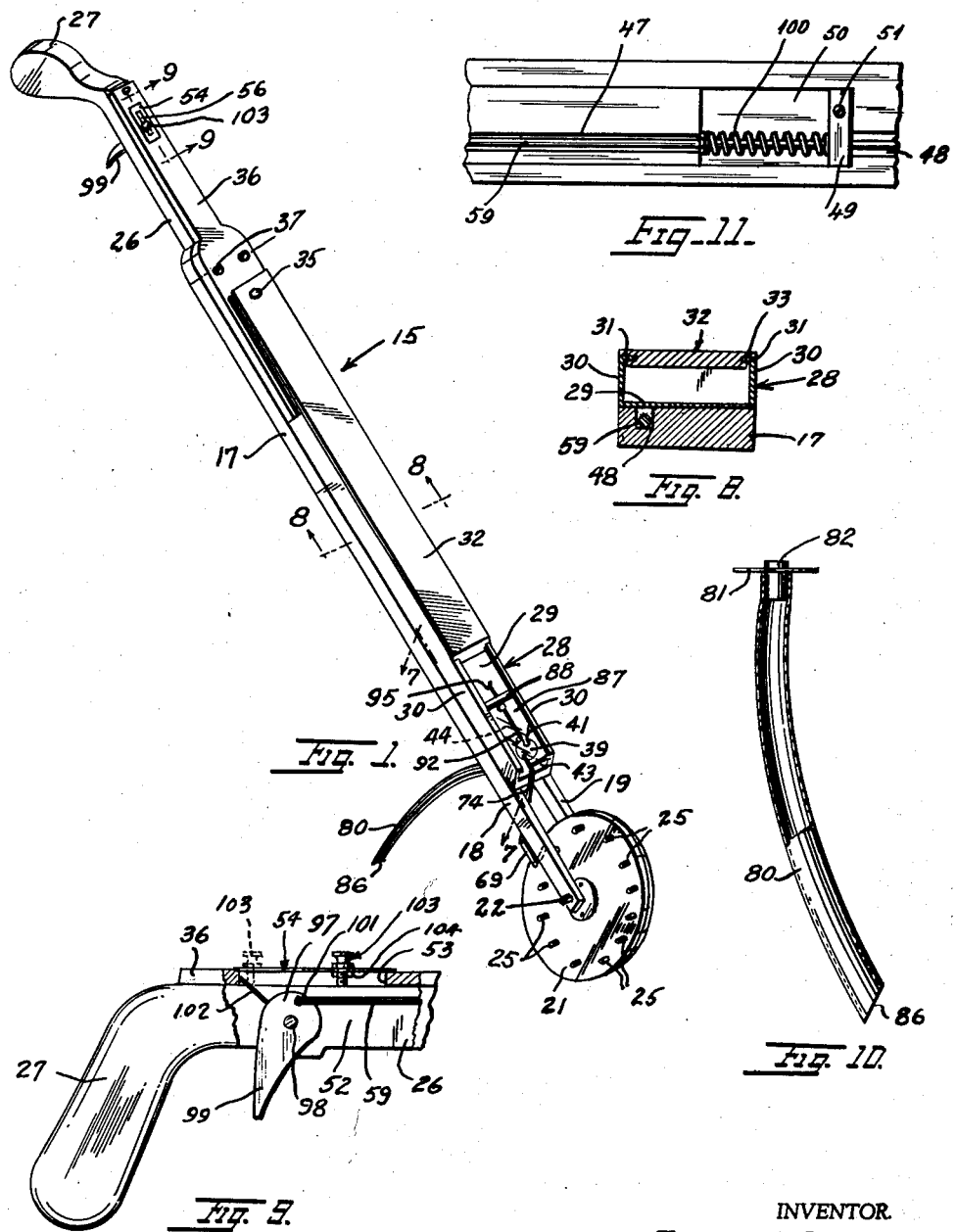

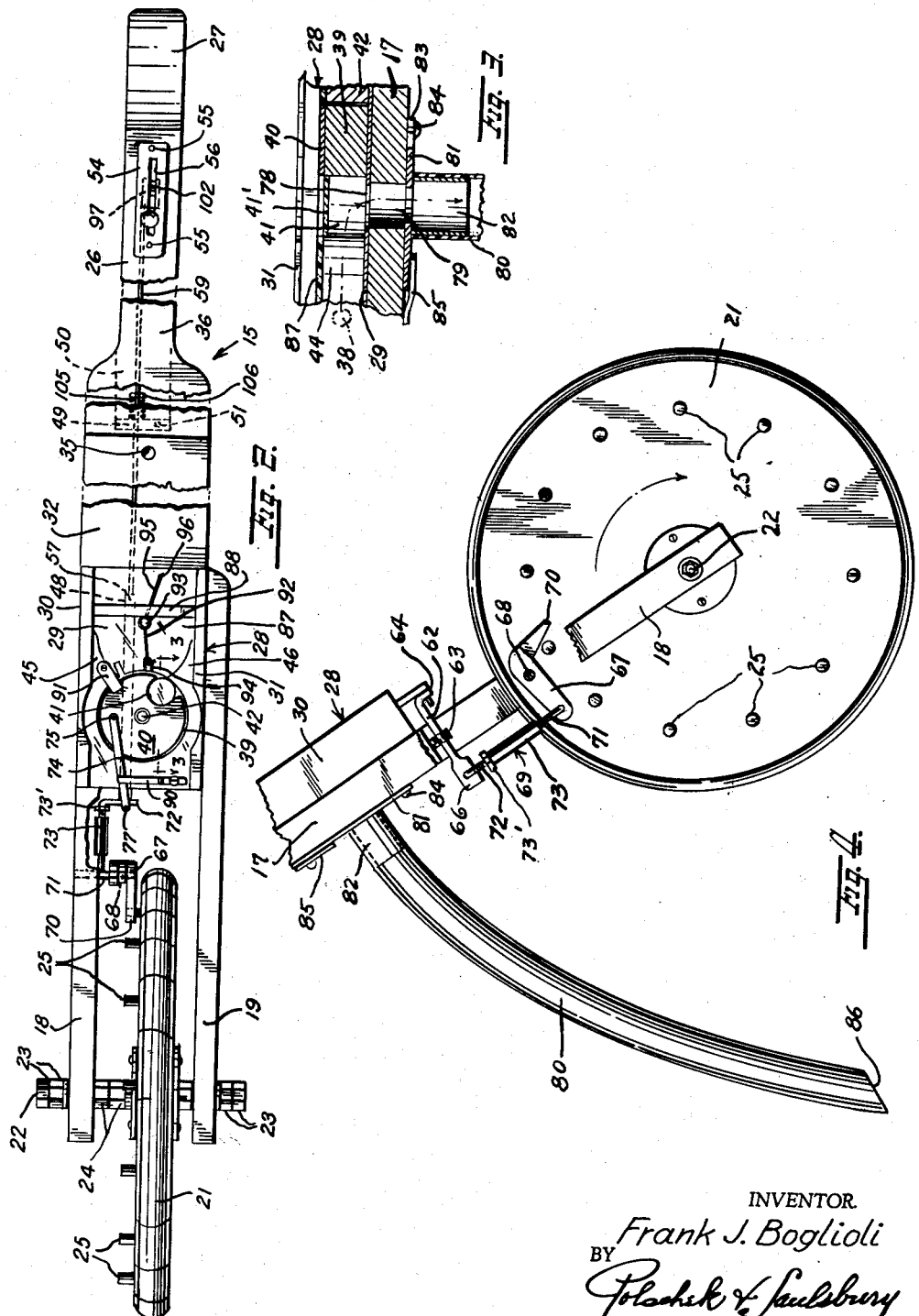

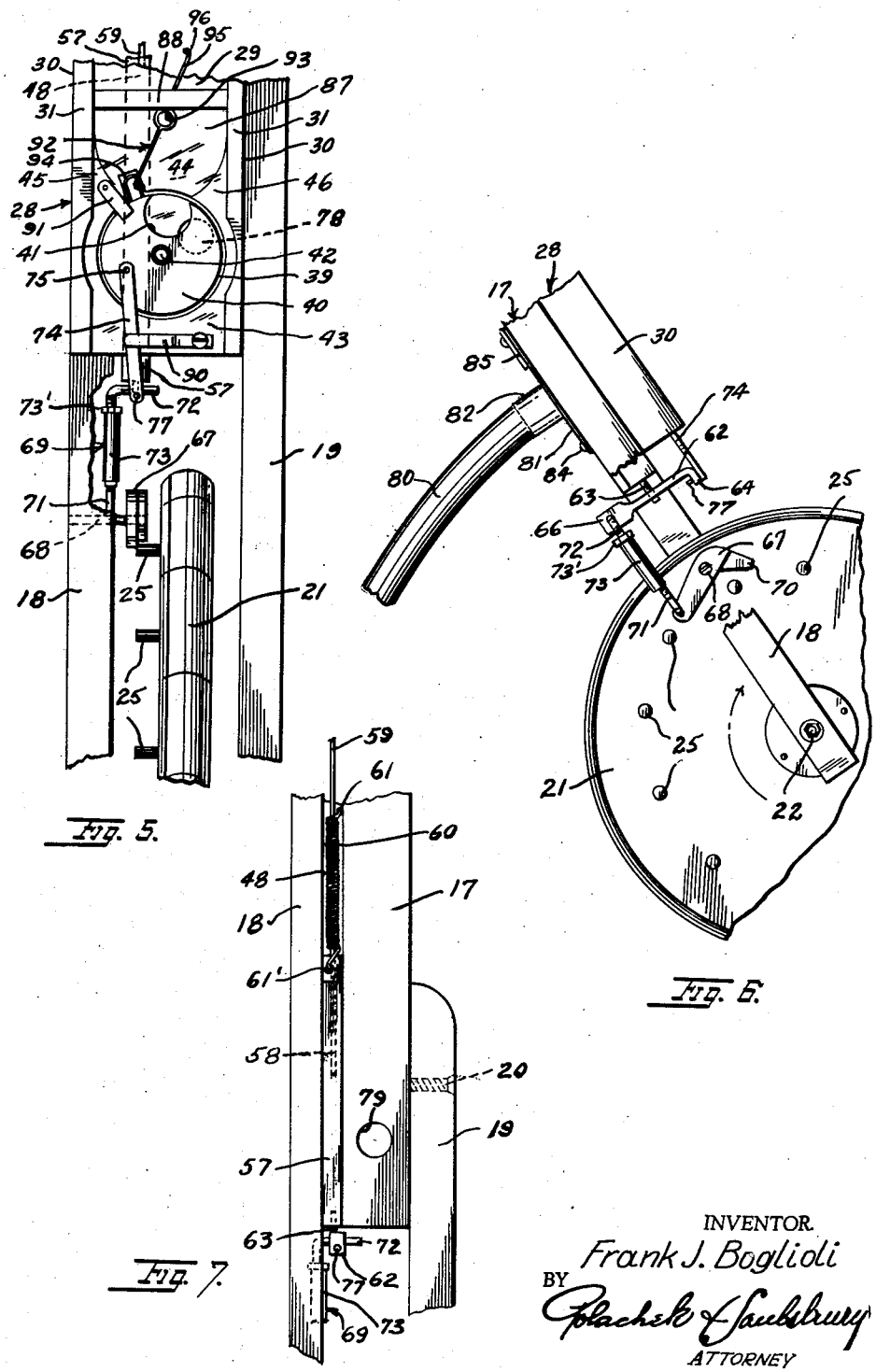

3,179,297
COMBINED AUTOMATIC AND HAND-OPERATED GARDEN SEEDER
Frank J. Boglioli, 28 E. Clinton St., Newton, N.J.
Filed Apr. 16, 1963, Ser. No. 273,440
5 Claims. (Cl. 222—177)

This invention relates generally to seeders or planters and more particularly to a new and useful improvement in a combined automatic and hand-operated garden seeder.

For certain types of planting, automatic feeding of the seed is desirable while in other types hand-operated feeding devices are desirable. Accordingly, a seeding device that is selectively capable of either automatic or hand-operated feeding of the seed is desired.

An important object of the invention is to provide means for positively feeding the seed to the distributing means and to provide means for readily controlling the feed for causing the desired quantity of seed to be discharged over a given area.

A specific object of the invention is to provide a seeding device having a ground supporting wheel with means associated with the wheel for automatically discharging seeds in a controlled quantity and having means independent of the wheel for manually controlling the discharge of the seeds.

For further comprehension of the invention and of the objects and advantages thereof, reference may be had to the following description and accompanying drawings and to the appended claims, in which the various novel features of the invention are more particularly set forth in the following description taken in connection with the accompanying drawings, in which:

FIGURE 1 is a top perspective view of a seeder or planter embodying the features of the invention, the cover of the hopper being slid upwardly to show interior parts, FIG. 2 is an enlarged top plan view of the seeder shown in FIG. 1, with parts being broken away, FIG. 3 is an enlarged fragmentary sectional view taken generally on the line 3—3 of FIG. 2, showing a seed and path thereof in dot and dash lines, FIG. 4 is an enlarged fragmentary side elevational view of the ground and tripping wheel and the associated parts thereof, FIG. 5 is an enlarged fragmentary top plan view of the tripping and distributing mechanism on a still larger scale, with parts being shown broken away, FIG. 6 is a fragmentary side elevational view of the tripping mechanism of FIG. 4, parts being broken away and the trip lever pivoted from wheel pins, FIG. 7 is an enlarged fragmentary transverse sectional view taken on the line 7—7 of FIG. 1 and looking in plan upon the bottom of the seed box, FIG. 8 is an enlarged cross-sectional view of the planter taken on the line 8—8 of FIG. 1, FIG. 9 is a fragmentary sectional view taken on the line 9—9 of FIG. 1, parts being shown broken away, FIG. 10 is a part elevational and part sectional of the discharge nozzle, and FIG. 11 is a fragmentary plan view of the body part with cover plate removed showing portions of the tripping mechanism.

Referring in greater detail to the various views of the drawings, a combined automatic and/or mechanically-operated seeder or planter embodying the invention is shown in FIG. 1 and designated generally by the reference numeral 15. The seeder 15 is of the wheel-supported type and includes an elongated main body member or flat wooden bar 17 with a bifurcated end constituted by spaced extensions 18 and 19, the extension 19 being formed separately and secured to the body member 17 by screws 20. A wooden ground wheel 21 is disposed in the space between the extensions 18 and 19 and is rotatably supported at its center by an axle 22 extending through a central opening in the wheel and through openings in the extensions 18 and 19 adjacent the outer ends thereof. The axle is secured in place by outer locking nuts 23 and the wheel is held in proper spaced position by inner spacing nuts 24. The wheel 21 is disc-shaped with a curved periphery and has a series of spaced pins 25 protruding outwardly from one side face thereof adjacent its periphery. While the body member 17 and wheel 21 are shown formed of wood, it will be understood that they may be made of any suitable material. The opposite end of the body member 17 is reduced in width forming a narrow extension 26 which terminates in a slanting enlargement forming a pistol grip 27.

An elongated channel-shaped metal seed hopper 28 is detachably fastened in any suitable manner to the top surface of the bar 17, for approximately one-half of its length, the bottom half as viewed in FIGS. 1 and 2. The hopper 28 comprises a bottom wall 29 and side walls 30 and it is open at both ends. The side walls are formed with inwardly extending flanges 31. The hopper opens outwardly and upwardly and as viewed in FIGS. 1 and 2 for the length thereof. An elongated rectangular-shaped wooden plate 32 slidably closes the open top of the hopper. Closure plate 32 is formed with grooves 33 in its side edges adapted to receive and be guided by the free edges of the inwardly-extending flanges 31. A recess 35 is formed in the top surface of the closure plate 32 at one end thereof to serve as a finger piece in order to slide the closure plate 32, between open and closed positions.

Another elongated wooden plate 36 is detachably fastened on the remaining top half of the top surface of the elongated body member or wooden bar 17 by means of screws 37. This elongated plate 36 has a shape corresponding to the shape of the adjacent end of the wooden bar 17 and extension 26.

The seed hopper 28 is adapted to contain a quantity of seed of any desired kind such as pea, bean or corn, a sample seed being shown in FIG. 3 and indicated at 38. An important feature of the invention, is mechanism for feeding, distributing and depositing the seed in a furrow behind the tripping and supporting ground wheel 21.

Within the channel shaped seed hopper 28 at its outer end, there is a broad faced wooden disk or circular block 39 with a metal plate 40 suitably fastened to the top surface thereof. The wooden disc or circular block 39 is formed with a pocket 41 in its periphery. The disc or block 39 is oscillatably mounted on a stub shaft 42 secured in an upright position on the bottom wall 29 of the hopper 28. The disc 39 turns in a plane parallel to the plane of the bottom wall 29 of the hopper. Around the disc or block 39, there is an annular guide plate 43 secured to the bottom wall 29 of the hopper at the end thereof. The annular guide plate 43 has a cutaway portion 44 communicating with the space in the hopper above the disc 39 and also has extensions 45 and 46 extending inwardly of the hopper and extending upwardly along its side walls 30. The extensions are formed with curved inner walls providing thereby the cutaway portion 44 in the guide plate 43. The disc 39 is adapted to be oscillated so as to bring its pocket 41 into register with the cutaway portion 44 in the guide plate 43, and thus serves as a rotary valve.

The mechanism for automatically actuating the oscillating disc 39 will now be described. A continuous groove 48 is formed in the top surface of the bar 17 and extension 26 as viewed in FIG. 7. The groove 48 is interrupted midway the ends of the bar 17 by a wooden cross piece 49 mounted in a recess 50 formed in the top surface and secured by means of a screw 51, FIGS. 2 and 11. The groove 48 intersects the bifurcated end of the wooden bar 17 and terminates at the other end of the bar in an enlarged opening 52 extending through the extension 26. An elongated closed slot 53 is formed in the closure plate 36 at its outer end, in alignment with the enlarged opening 52 in the extension 26. A metal plate 54 is secured over the slot 53 by screws 55 and is formed with an elongated central slot 56, FIG. 2. A wooden bar 57 is slidably fitted in the end of the groove 48 adjacent the bifurcated end of the body bar 17 and is formed with an axial socket opening 58, FIG. 7. A metal round rod 59 is slidably mounted in the groove 48 with one end slidably fitted in the socket opening 58 of the bar 57 and extending rearwardly through an opening in the cross piece 49 to the bifurcated end of the body bar 17. A tension spring 60 is coiled around the rod 59 adjacent the wooden slide bar 57. Spring 60 has one end fastened to a screw 61 in the bottom of the groove 48 and has its other end anchored to the inner end of the bar 57 at 61′ whereby the wooden bar 57 is biased to innermost inoperative position as shown in FIG. 7. A lever in the form of a flat metal bar 62 is secured to the outer end of wooden slide bar 57 by a screw 63 and is disposed perpendicularly thereto. One end of lever 62 is bent at right angles to the plane of the bar as indicated at 64 and is formed with a hole therein. The other end of the lever is formed with a half turn and with a hole 66 therein. A bell crank lever 67 is fastened to a pivot pin 68 extending from and journalled in the inner surface of the extension 18 of the wooden bar body member 17. A bolt and nut or adjustable link assembly 69 is interposed between the lever 62 and the long arm of the bell crank lever 67. A short arm 70 of the bell crank lever disposed to lie in the path of movement of the protruding pins 25 on wheel 21. The bolt and nut or link assembly 69 is adapted to carry the movement from the bell crank lever 67 to the lever 62 connected to the slide bar 57 and actuating rod 59. This bolt and nut assembly 69 consists of a pair of angularly-shaped bolts 71 and 72. One end of bolt 71 is pivotally connected to the long arm of the bell crank lever 67, and one end of the bolt 72 is pivotally connected to and extends through the flattened perforated end 66 of the lever 62. The other and opposed ends of the bolts 71 and 62 are threaded. An elongated tubular internally screw-threaded nut turnbuckle 73 is interposed between the threaded ends of the bolts 71 and 62 and is in threaded engagement therewith whereby the distance between the connected ends of the levers 62 and 67 may be adjusted. The connection between the lever 62 and the oscillating disc 39 consists of a short link or lever bar 74 carrying a pin 75 at one end engaged in a hole formed in the top surface of the disc 39, adjacent the periphery thereof, and carrying a pin 77 at the other end disposed in the hole in the bent end 64 of lever 62. Straight movement of lever 62 causes an outward pull of the lever bar 74 eccentrically or tangentially of the disc 39 whereby the disc is pulled around or oscillated carrying the pocket notch 41 thereof into register with a discharge hole 78 in the bottom wall 29 of the hopper 28 and into register with a discharge opening 79 formed in the bar 17 in line with the discharge hole 78. A discharge nozzle constituted by a flexible plastic tube 80 is detachably mounted on the body member wooden bar 17 in line with the discharge opening 79 therein. This mounting includes a short metal plate 81 having a central opening and a socket 82 protruding from said central opening. The plate 81 is removably attached to the wooden bar 17 by a slot 83 formed in one end thereof and intersecting said end, interlocking with a headed pin 84 secured in the wooden bar 17 at one side of the discharge opening 79. A pivotally-mounted latch member 85 secured to the underside of the wooden bar 17 at the opposite side of discharge opening 79 holds releasably the other end of the plate 81. One end of the tube nozzle 80 is removably fitted over the socket 82 so that the nozzle extends outwardly from the wooden bar 17. The free end edge 86 of the nozzle is preferably tapered.

A thin transparent sheet 87 of plastic material is preferably fastened to the top of guide plate 43. This guide plate being perforated to receive the disc 39 and extending inwardly beyond the ends of extensions 45 and 46 and its inner edge being received in a groove formed in a wooden cross brace member 88 secured between the side walls 30 of the hopper 28. A long finger piece 90 and a short finger piece 91 are pivotally mounted on the top sheet 87 adjacent disc 39. These finger pieces are adapted to be swung over the top surface of the disc 39 in frictional engagement therewith to prevent accidental outward displacement of the disc 39.

An elongated wire spring 92 is coiled around an upstanding post 93 protruding upwardly from the bottom wall 29 of hopper 28. One end of the wire spring 92 is fastened to a wire loop 94 radiating from the broad width edge of the disc 39. This wire spring 92 has an extension 95 with a finger piece 96 thereon. Disc 39 when it is rotated, it pivots the spring wire so as to keep the seed flowing into the hopper 28. By sliding up the cover plate 32 of the hopper 28 and grasping the finger piece of the wire extension the spring can be manually worked to free the seed in the bottom space 44 of guide plate 43 of the hopper. Seed may also be added to the hopper at this time. The seeder is raised to an upright position such as shown in FIG. 1 to permit the seed to fall by gravity into the guide plate 43 and against the curved walls 47 thereof so that the seed is guided to the cutaway portion 44 of the guide plate and into the pocket 41 in the disc 39. The wheel 21 is placed in the furrow desired to be seeded and pushed along whereupon the pins 25 engage the short arm 70 of the bell crank lever 67 which in turn trips the lever 62 with attached lever 74 against the action of spring 60 of the wood slide bar 57 thereby turning the disc 39 with its supply of seed until the pocket 41 is above the aligned hole 78 in the bottom of the hopper and opening 79 in the body bar 17, respectively, whereupon the seed is discharged by gravity into the tube nozzle 80 and finally into the furrow. Upon release of the pressure on the bell crank lever 68, that is, upon movement of the wheel pin 25 away from the bell crank lever, the spring 60 retracts the disc 39 and associated parts to normal condition so that the notch 41 of the disc 39 is again aligned with the space 44 of the guide plate 43 to receive the seed for the next planting.

To manually release the seed without the use of the wheels, a trigger disc 97 is rotatably mounted in the enlarged opening 52 in the handle extension 26 of the body bar 17 on a pivot pin 98 connected to one of the side walls of the enlarged opening 52. A trigger portion 99 is formed integrally with the disc 97 and extends downwardly and outwardly of the enlarged opening 52 and of the handle extension 26. The adjacent end of rod 59 is bent and embedded in a socket opening 101 formed in one of the side surfaces of the trigger disc 97 adjacent the periphery of the trigger disc 97. A pin 102 extends radially from the periphery of the disc protruding above the top surface of the handle extension 26. The pin 102 is disposed at an angle to the trigger and is normally urged against one end wall of the enlarged opening 52 by the rod 59 acting upon the trigger disc. A bolt and lock nut assembly 103 is slidably and adjustably carried by the plate 54 in the closure plate 36 with a bolt extending through the slot 56 in said plate 54 and protruding downwardly into the path of movement of the pin 102 on the trigger disc 97. A lock nut 103 is adapted to slide along the plate 54 and to be clamped downward against the top surface to hold the assembly 103 in its adjusted position.

By pulling on the trigger portion 99 the rod 59 and slide bar 57 is pushed toward the bifurcated end of the body bar 17 thereby tripping the lever 62 which in turn trips the lever 74 for turning the seed disc 39 with its supply of seed in its pocket 41. The pushing movement of the rod 59 is against the action of a compression spring 105 coiled around the rod 59, FIG. 2 and having one end impinging against the cross piece 49 and its other end impinging against a shoulder 106 provided on the rod 59 in the recess 50. When pressure is released from the trigger disc 97 the spring 105 retracts the disc 39 and associated parts to a normal position.

The adjustment of the bolt and lock nut assembly 103 serves to limit the turning movement of the seed disc 39 and to regulate the same to different size seed and the registry of the notch 41 of the seed disc 39 with the hole 78 in the bottom of the hopper 28.

When it is desired to manually feed the seed as aforesaid it is preferable that the bell crank lever 62 be made ineffectual. This is done by lengthening the distance between the bellcrank lever 67 and the lever 62 by turning the turnbuckle nut 73 whereupon the short arm 70 of the bell crank lever 67 is swung toward the periphery of the wheel 21 out of the path of movement of the wheel pins 25.

When the automatic operation of the planter is done by the wheel 21 the amount of turning movement of the seed disc 39 and amount of registry of its notch 41 with the seed discharge holes 78 is regulated by adjusting the turnbuckle 73 of the nut and bolt assembly link 60 to shorten or lengthen the same.

From the above description, it will be seen that I have provided a simple and very efficient structure of a combined automatic and manually-operated seeder. The device can be easily adjusted to plant different size and number of grains or seeds. The structure is simple and very easily operated and the device is at the same time quite rugged and of convenient light weight to handle. The seeder has been amply demonstrated in actual practice and found to be very successful and efficient.

While I have illustrated and described the preferred embodiment of my invention, it is to be understood that I do not limit myself to the precise construction herein disclosed and that various changes and modifications may be made within the scope of the invention as defined in the appended claims.

What is claimed is:

1. A seed planter of the kind described comprising an elongated flat bar, with a bifurcated end, a ground supporting disc-shaped wheel supported at the bifurcated end of the bar, said wheel forming an extension of the bar, spaced pins protruding radially from one side surface of the wheel adjacent the periphery thereof, a seed hopper on the bar, said hopper having an outlet at one end thereof, a discharge tube operatively connected to the outlet, a disc-like seed depositing block rotatably supported on said bar over said outlet, said block having a pocket in its periphery adapted to be filled with seed from the hopper by gravity and adapted to be moved into communication with said outlet, a bell crank lever pivotally mounted on the bar adjacent said wheel, one arm of said lever positioned in the path of movement of said pins, a movable lever operatively connected to said bell crank lever for movement in a plane at right angles to the plane of movement of the block, another lever having one end pivotally connected to said movable lever and its other end eccentrically and pivotally connected to the block for intermittently rotating the block to carry the pocket with seed into communication with the outlet in the hopper.

2. A seed planter as defined in claim 1, and spring means operatively connected to said movable lever for retracting the block and associated parts.

3. A seed planter as defined in claim 1, and spring means operatively connected to said movable lever for retracting the block and associated parts, said operative means of connection between the bell crank lever and movable lever including means for adjusting the distance between said levers.

4. A seed planter as defined in claim 3, and said adjusting means including a pair of spaced bolts in alignment, one end of each of said bolts pivotally connected to the bell crank lever and other lever, respectively, the other end of each of the bolts being threaded, and an elongated tubular nut interposed in the space between the bolts, the ends of the nut being in threaded engagement with the threaded ends of the bolts.

5. A seed planter of the kind described comprising an elongated flat bar, said bar having a groove in its upper surface for the length thereof, a ground supported wheel at one end of the bar, an elongated round rod slidably mounted in said groove, a seed hopper on the bar, said hopper having an outlet at one end thereof, a discharge tube operatively connected to the outlet, a disc-like seed depositing block rotatably supported on said bar over said outlet, said block having a pocket in its periphery adapted to be filled with seed from the hopper by gravity, a lever operatively connected to one end of said rod, a lever having one end pivotally connected to said first-named lever with its other end eccentrically and pivotally connected to the block and a movable finger trigger operatively connected to the other end of the rod for sliding said rod, spring means associated with the rod for retracting the block and associated parts, means for adjusting the throw of said trigger including a pin radiating from said trigger and a bolt and nut assembly slidably mounted on the adjacent end of the bar, the bolt being disposed in the path of movement of the pin on the trigger.

References Cited by the Examiner

UNITED STATES PATENTS

| 2,207,665 | 7/40 | Hennesse | 222—177 X |
| 2,311,038 | 2/43 | Efird | 222—176 X |
| 2,499,976 | 3/50 | Rockwood et al. | 222—362 X |

EVERETT W. KIRBY, *Primary Examiner.*

HADD S. LANE, *Examiner.*